(12) United States Patent
Lorente

(10) Patent No.: US 6,635,176 B1
(45) Date of Patent: Oct. 21, 2003

(54) WATER CONSERVATION APPARATUS

(76) Inventor: Gabriel L. Lorente, 8042 N. Callisch, Fresno, CA (US) 93720

( * ) Notice: Subject to any disclaimer, the term of this patent is extended or adjusted under 35 U.S.C. 154(b) by 96 days.

(21) Appl. No.: 10/055,413

(22) Filed: Oct. 29, 2001

(51) Int. Cl.[7] .............................................. B01D 29/05
(52) U.S. Cl. ...................... 210/238; 210/416.1; 210/459
(58) Field of Search ............................... 210/238, 416.1, 210/459

(56) References Cited

U.S. PATENT DOCUMENTS

| | | | | |
|---|---|---|---|---|
| 3,799,349 A | * | 3/1974 | Stewart | 210/154 |
| 3,808,631 A | * | 5/1974 | Shibata et al. | 15/321 |
| 3,817,382 A | * | 6/1974 | Arneson | 210/169 |
| 4,351,723 A | * | 9/1982 | Palmer | 210/198.1 |
| 4,360,947 A | * | 11/1982 | DeCosa et al. | 15/323 |
| 4,934,874 A | * | 6/1990 | Kleer et al. | 405/303 |
| 5,349,722 A | * | 9/1994 | Chayer | 15/353 |
| 5,490,923 A | * | 2/1996 | Penney | 210/169 |
| 5,761,762 A | * | 6/1998 | Kubo | 15/320 |
| 6,098,813 A | * | 8/2000 | Cini | 210/356 |
| 6,352,645 B1 | * | 3/2002 | Wilfong | 210/767 |

* cited by examiner

*Primary Examiner*—Fred G. Prince

(57) ABSTRACT

A water conservation apparatus for recycling wasted water from spills on sidewalks or from water runoff found in street gutters. The water conservation apparatus has a shovel-like scoop component that is capable of scooping the water into the scoop and temporarily holding the water. A pump component fluidly connected to the trapped water held by the scoop is capable of removing the trapped water held by the scoop via a conduit network. The water may be discharged from the pump through a tube to any desired location that the operator chooses, such as, delivering the retrieved water to irrigate a garden or a residential lawn.

17 Claims, 2 Drawing Sheets

WATER CONSERVATION APPARATUS

BACKGROUND OF THE INVENTION

1. Field of the Invention

The present invention relates to water conservation and, more particularly, to water recycling for use in residential urban settings, even more particularly, to an apparatus for recapturing and reusing water lost from runoff brought about by inefficient usage, such as recovering water runoff brought about by excessive or inefficient lawn irrigation.

2. Description of the Related Invention

No one doubts the need for water conservation. The Environmental Protection Agency (EPA) has recently issued "zero discharge" mandates designed to encourage domestic water conservation by regulating "gray water" recycling in domestic and industrial applications. The U.S. Congress has promulgated regulations that require for newly manufactured toilets to have reduced flush volumes from 5 gallons to 1.6 gallons. Water conservation, especially in more arid climates, has become a major concern for various townships and principalities so that they can assure that there are sufficient supplies of water. For instance, in Mar. 20, 1995, Tucson, Ariz. has promulgating a rather draconian "Emergency Water Conservation Ordinance" to assure that it has adequate water supplies to provide for "life safety, and for fire protection" forts citizens. This particular ordinance grants the power to disconnect the residential water supply, as well as, to fine violators up to $250.00 who waste water by allowing their residential lawn irrigation water to runoff onto sidewalks and into street curbs. Clearly, this need to conserve and recycle water will become even more urgent and widespread in the future as water supplies continue to dwindle. Consequently, various strategies have been employed to reduce the amount of wasted water in residential settings.

The garden hose attached to a sprinkler has long been the most common lawn irrigation system found in the residential urban setting. Unfortunately, this hose/sprinkler combination suffers the serious drawback in water conservation efforts by creating a significant risk of wastewater runoff when the user simply forgets to turn off the water. By automatically timing the irrigation system, this problem of forgetting to turn off the water problem has been solved. However, automatic timed controlled irrigation systems continue to suffers the disadvantage of creating excessive water runoff when the user improperly sets the timing mechanisms to supply amounts of water well beyond what is required for the lawn. Furthermore, even if the timed settings are correctly set, these automatic timed irrigation systems can still create excessive wastewater runoff when the residential lawn is already saturated or does not require any additional irrigation, such as, in the event when the automatic irrigation system irrigate the lawn during a rain storm. Furthermore, these automatic timed lawn irrigation systems still suffer the disadvantage of being prone to creating excessive wastewater runoff even when the timing is properly set. That is, waste water runoff can still occur from automatically timed lawn irrigation systems when the sprinklers have been improperly aimed and as a result these improperly aimed sprinklers can spray water directly onto the sidewalks and into the streets. Another strategy has been to couple a moisture detector to an automatic controlled irrigation system so that the automatic irrigation system doesn't irrigate the lawn when there are adequate moisture levels within the soil. Unfortunately, these moisture detector automatic irrigation systems still do not address the problem of improperly aimed sprinklers and as a consequence can suffer the same disadvantage of causing waste water runoff into the street gutters brought about by misaligned sprinklers. Furthermore, these moisture automatic irrigation systems suffer the additional disadvantage of being relatively expensive. An alternate strategy in residential water conservation has been to use drip irrigation systems. However, water drip irrigation systems remain prone to the disadvantage of allowing wastewater runoff to occur when the user forgets to turn off the water. In addition, these drip irrigation systems suffer the added disadvantage of requiring an extensive network of drip hoses to irrigate a lawn and as a consequence are either relatively expensive and/or physically burdensome to arrange in the lawn each time the lawn must be irrigated. Thus, all of the commonly available residential lawn irrigation systems seem to suffer the same disadvantage, in that, all of these irrigations systems will suffer the problem of causing the inevitable loss of some irrigation water onto the residential sidewalks and into the street gutters.

Kubo's (U.S. Pat. No. 5,761,762) describes a cleaning device having a power source, a vacuum generator, a waste liquid tank and a wipe-nozzle unit where liquids and/or contaminants may be removed by slid ably moving a wiper on a flat surface to collect a mass of liquid and inserting a small sized nozzle at the collection liquid to suck it through the nozzle when the interior of the cleaner is drawn into vacuum. As a consequence, Kudo's device requires the spill zone to contain the gathered up liquid because Kudo's device envisions only a wiping blade absent a bottom element. Therefore, one could not actively scoop up a liquid into a zone within the scoop and subsequently allow the liquid to be sucked out of the trap zone within the scoop. Furthermore, Kubo's device is limited to having a waste liquid tank associated with the device, which would require the operator to periodically drain the collected water from the waste liquid tank and thus making Kubo's device cumbersome for recycling large volumes of liquids. In addition, Kubo's device does not have a filtering element and therefore Kubo's device is likely to fail if used to recycle water in street gutters due to the possibility that leaves, rocks and other debris could clog the intake device. Therefore, these and other reasons make the cleaner and bowling maintenance machine of Kubo undesirable for use as a water conservation device for recycling wastewater runoff from residential urban environments such as on sidewalks and in runoff in street gutters.

DeCosa and Spector (U.S. Pat. No. 4,360,947) describe a dust collector device which has a bucket into which ashes and dust from a wood stove or fireplace is shoveled by a vacuum cleaner so as to prevent the ashes from dispersing into the breathing space of the user cleaning up the ashes. This device includes a removable cover having a connection to a vacuum cleaner hose, for transferring the dust an ash from the bucket to the vacuum cleaner and in one embodiment includes a shovel connected to the bucket so that the dust and ash is directly sucked into the bucket by the vacuum. This dust collector device would likely prove inadequate for removing waste water from urban environments because water drawn into the bucket would likely cause a serious electrical shock hazard, as well as the bucket would require that the bucket be drained during the operation and thus making it inconvenient to use. Furthermore, the dust collection system is explicitly designed to accept large solid debris particles which is contrary to recycling water because it would likely result in producing the undesirable result in transferring rocks, leaves and other debris along with the recycled water onto a well tended lawn or garden. Therefore, these and other reasons make the dust collector device of De Cosa and Spector undesirable for use as a water conservation device for recycling wastewater runoff from residential urban environments such as on sidewalks and in runoff in street gutters.

Shibata et al., (U.S. Pat. No. 3,808,631) describe a device for removing sludge from a surface that is adapted to be moved along the sludge with its opened mouth positioned to receive the sludge. The construction of this device requires a connection for directing a high velocity liquid jet into the shovel in the vicinity of the mouth to impinge upon the sludge and to break it up so that it can be sucked away. Shibata's device would likely fail in being an effective device to recycle water because Shibata's device requires a high velocity liquid jet to interact with the spill. As a result, if the liquid jet material is something other than water, Shibata's device contaminates the water that was intended to be recycled. On the other hand, if the liquid jet material was water, then Shibata's device would likely fail in recycling a water spill because the Shibata's device would likely enhance the wasted water volume by squirting masses of water onto the existing water spill zone and thus aggravating the spill by enhancing the spilt volume of water. Therefore, these and other reasons make the sludge-removing device of Shibata's undesirable for use as a water conservation device for recycling wastewater runoff from residential urban environments such as on sidewalks and in runoff in street gutters.

Chayer (U.S. Pat. No. 5,349,722) describes a method and apparatus for containing and evacuating fluids having a containment boom and a pump for creating a vacuum in the boom and compressing a portion of the lower side of the boom against a surface on which the boom is placed to lock to boom in place and form a barrier against the fluid on the surface. Since Chayer requires the device to be open bottomed boom scooping up wastewater to would be impossible with Chayer's device. Furthermore, the Chayer device does not have an arm element attached to the boom and therefore making Chayer's device difficult to maneuver. Therefore, these and other reasons make Chayer's apparatus undesirable for use as a water conservation device for recycling wastewater runoff from residential urban environments such as on sidewalks and in runoff in street gutters.

Kleer et al. (U.S. Pat. No. 4,934,874) describe a mobile pumping apparatus for clearing sludge from underground mine galleries wherein Kleer's device comprises having a mobile transfer device, a high pressure piston pump, an elongated loading shovel, an elongated screw conveyor disposed in the shovel and an elongated stamping mill. Kleer's invention is designed to engage sludge mixed with rocks and to convey this entire sludge composition via a screw conveyor mechanism. As a consequence, Kleer's device would be undesirable as a water recycling apparatus because it would likely result in producing the undesirable result in transferring rocks, leaves and other debris along with the recycled water onto a well tended law nor garden. Furthermore, because Kleer's device requires a high-pressure piston pump as well as an elongated stamping mill to function, then Kleer's device would be exorbitantly expensive to own and operate. Therefore, these and other reasons make Kleer's apparatus undesirable for use as a water conservation device for recycling wastewater runoff from residential urban environments such as on sidewalks and in runoff in street gutters.

None of the above mentioned strategies or devices have adequately addressed the apparently inevitable problem of what to do with the wastewater runoff, such as in a street gutter, once it has been detected. Therefore, there is a need for an apparatus that is capable of retrieving or recycling this type of wastewater that is commonly occurs in the residential settings to conserve America's most valuable limited resource, fresh water. The instant invention is designed to overcome the problem by conserving otherwise wasted water by recycling this water via an apparatus which can retrieve this otherwise lost water back to a desired location.

SUMMARY OF THE INVENTION

The apparatus of the present invention overcomes the above-mentioned disadvantage by directly addressing the problem of how to recover or recycle the wastewater instead of trying to prevent the wastewater spill from occurring. More particularly, a preferred embodiment of the present invention comprises a scoop means for capturing and trapping an aliquot of the wastewater runoff from an environment, such as from a street gutter, and coupled this scoop means to a pumping means to deliver the captured aliquot of water to any desired location, such as returning the water back to the lawn or garden.

In a preferred embodiment, the water conservation apparatus comprises a scoop having a screen panel, a bottom panel, a top panel, a back wall, and two side walls, wherein the screen panel, the bottom panel, the top panel and the two side walls form a front end of the scoop for receiving a portion of water from a water spill zone, wherein the screen panel in the scoop front end forms a filter for preventing leaves and debris from entering through the scoop front end, and wherein the bottom panel, the back wall and the two side walls form a cavity for holding the portion of water; an arm having a bottom end, a top end and a middle portion therebetween, wherein the arm bottom end is fixed to the scoop back wall; a stand having a top end and a bottom end, wherein the top end of the stand is pivotably connected to the arm middle portion for pivoting the stand at an oblique angle from the arm for supporting the arm to a first position for contacting a support surface with the stand bottom end and for pivoting the stand to a second position substantially parallel to the arm for convenient storage; a conduit having a first end and second end, wherein the conduit first end is fluidly connected to the cavity for accepting the portion of water; a pump having an intake and an output, wherein the pump is attached to the scoop top panel and the pump intake is fluidly connected to the conduit second end for supplying a vacuum through the conduit to transfer the portion of water from the holding cavity to the pump; and a hose having an entrance and an exit, wherein the hose entrance is fluidly connected to the pump output for transferring the portion of water from the pump to the hose exit for delivery of the portion of water to a desired location.

In another embodiment, the water conservation apparatus comprises a scoop having a bottom, two side walls and a rear wall, wherein the front of the bottom and the front of the two side walls form an entrance for accepting an aliquot of water from a water spill zone, and wherein the back of the bottom, the back of the two sides and the rear wall form a trap for temporarily holding the aliquot of water; a conduit having a first end and a second end, wherein the conduit first end is fluidly connected to the trap for drawing off the aliquot of water from the trap into the conduit; a pump having an input and an output, wherein the input is fluidly connected to the conduit second end for pumping the aliquot of water through the conduit to the pump; wherein the pump is for pumping the aliquot of water from the pump out through the pump output.

BRIEF DESCRIPTION OF THE DRAWING

For a more complete understanding of the present invention and for further objects and advantages thereof, reference may now be had to the following description taken in conjunction with the accompanying drawing, in which.

DETAILED DISCLOSURE OF PREFERRED EMBODIMENTS

Although specific features of the invention are shown in some drawings and not others, this is for convenience only as each feature may be combined with any or all of the other features in accordance with the invention.

While preferred illustrative embodiments of the invention are described above, it will be apparent to those skilled in the art that various changes and modifications may be made without departing from the invention. The appended claims are intended to cover all changes within the spirit of the invention.

Figure 1:
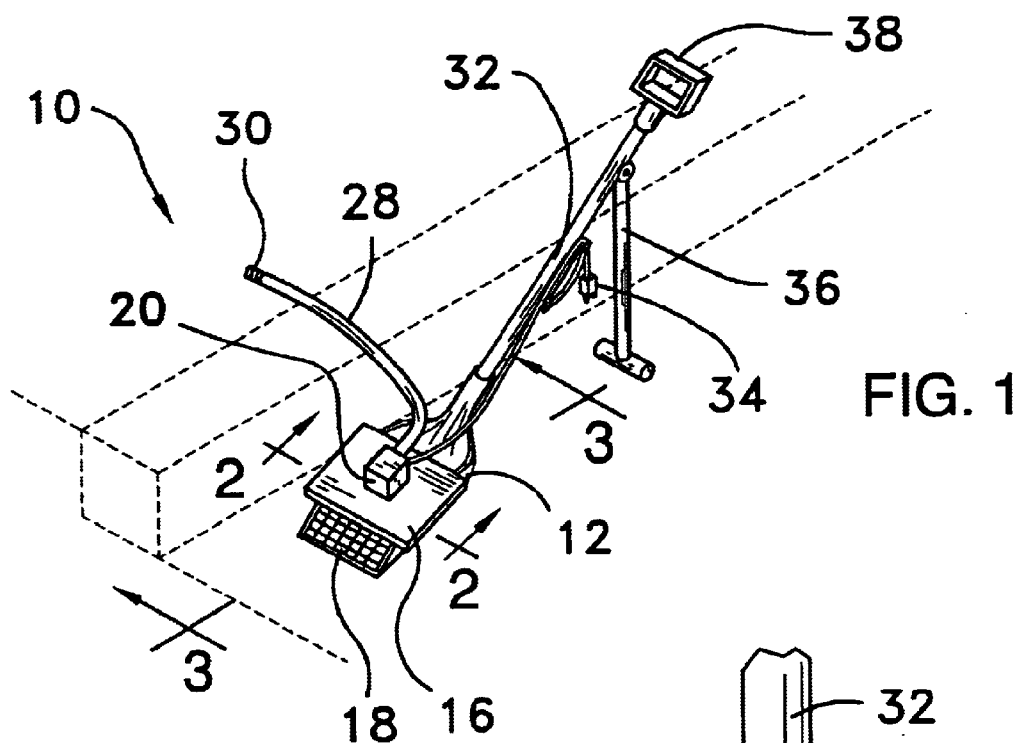
FIG. 1 is a perspective view of a water conservation apparatus according to the present invention.
Figure 2:
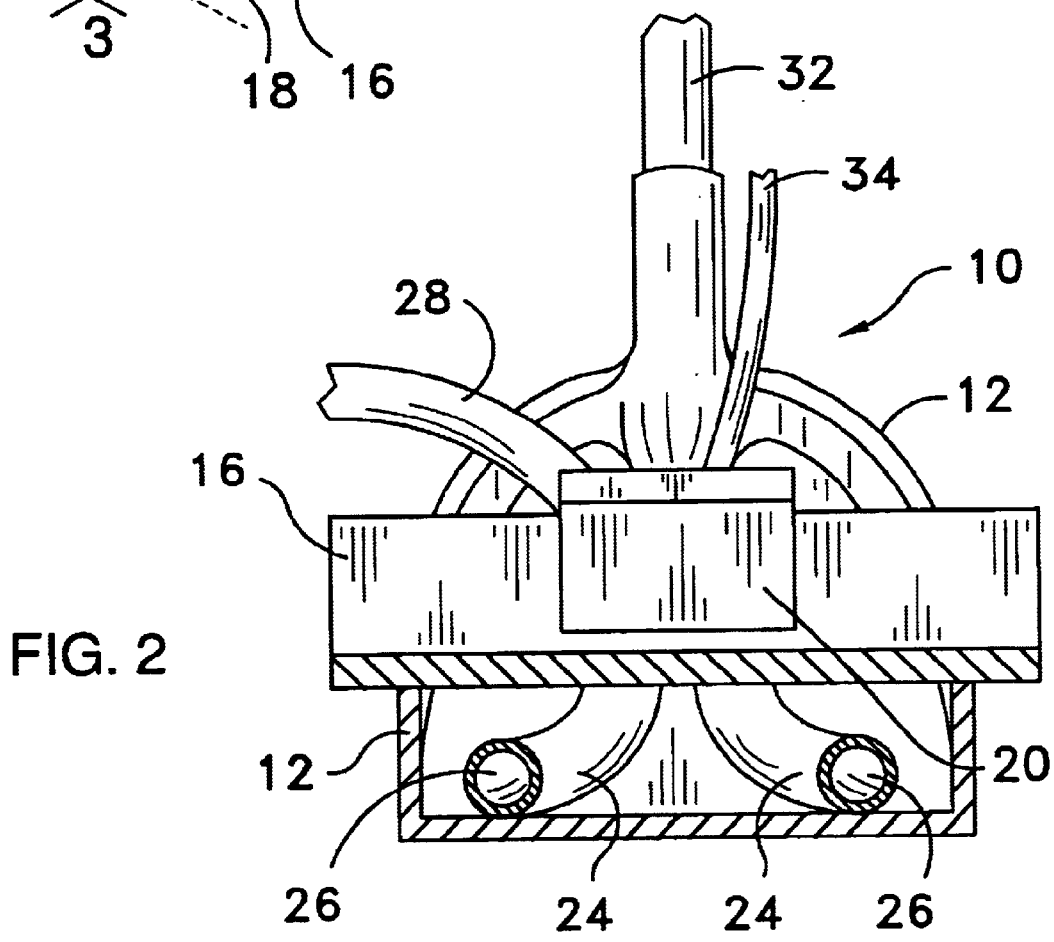
FIG. 2 is a frontal cross sectional view of the scoop of the water conservation apparatus.
Figure 3:
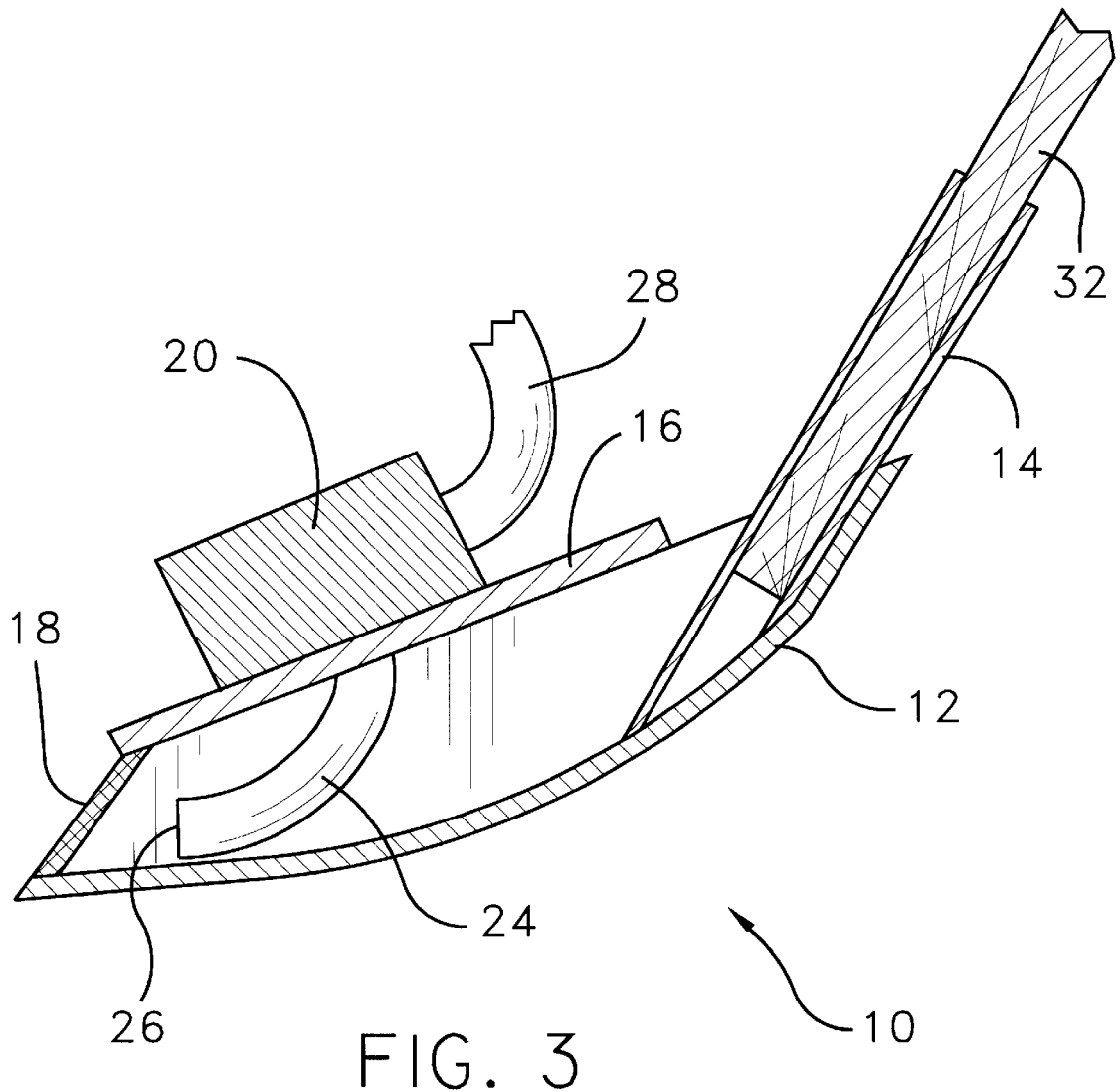
FIG. 3 is a lateral cross sectional view of the scoop of the water conservation apparatus.

[Paragraph] Referring now to the drawings, and particularly to FIG. 1–3, a preferred embodiment of the water conservation apparatus of the present invention is shown and generally designated by the reference numeral 10. This preferred embodiment of the water conservation apparatus 10 comprises a scoop 12 composed of a bottom panel attached to two side walls and a back wall 14, atop panel 16 and a screen panel 18. The portion of the scoop 12 comprising the bottom panel, two side walls and the back wall 14 may be made of composed of a single seamless material as pressed steel as found in a common standard shovel spoon. The screen panel 18 allows water to pass into the front end of the scoop 12 while preventing leaves and other debris from entering into the front end of the scoop 12. The cover panel 16 is mounted to the top of the two side walls and the pump 20 is mounted on top of the cover panel 16. The inlet of the pump 20 is fluidly connected to a conduit 24 in which the conduit input 26 is positioned within a zone of the which is capable of trapping and holding the water. The output of the pump 20 is also fluidly connected to a hose 28 so that the trapped water held in the scoop 12 can be evacuated through the conduit 24 to the pump 20 and from the pump 20 through the hose 28 and out through the hose exit 30 to any desired area. Attached to the back wall 18 of the scoop 12 is the bottom end of an arm 32 which may have brackets (not shown) attached to the middle portion of the an 32 so that the electrical cord 34 from the pump 20 may be conveniently safely stored. Attached to the top end of the arm 32 is an hand grip 34 38 so that the user may conveniently manipulate the water conservation apparatus 10. Pivotally attached to the middle section of the arm 32 is the top end of the stand 36, wherein the stand 36 is shown pivotally extended from the arm 32 in a first position so that the bottom end of the stand 36 can be used to contact a support surface and support the water conservation apparatus in a self standing operating mode.

Referring now to FIG. 2, a frontal cross sectional view of a preferred embodiment of the scoop 12 which illustrates the placement of the conduit 24 positioned near the bottom of the scoop so that the conduit input 26 can be fluidly connected to any water trapped by the scoop 12. Wherein the conduit also is fluidly connected to the pump 20. The pump 20 is also fluidly connected to the tube 28 for discharging the water evacuated from the scoop 12 via the conduit 26 to the pump 20 and out through the tube 28 to any location chosen by the user of the water conservation apparatus 10. The cord 34 supplies the electrical power to the pump 20. The cover panel 16 is mounted onto the two side walls of the scoop 12 and supports the pump 20. At the back wall of the scoop 20 is attached the arm 32 for convenient manipulation by the user of the water conservation apparatus.

Referring to FIG. 3 is a cross sectional side view of one of the preferred embodiments of the water conservation apparatus 10. The screen panel 18 functions by preventing leaves and other debris from entering into the front end of the scoop 12 while allowing water to freely flow through the screen panel 18 into the front end of the scoop 12 where the water is trapped in an area of the scoop 12. Attached to the side walls of the scoop 12 the cover panel 16 in which the pump 20 is attached. The conduit 24 is fluidly connected to the pump 20 and to the area within the scoop where any water may be trapped. The trapped water is evacuated into the conduit 24 to the pump 20 and discharged through the tube 28 that is fluidly connected to the pump 20. Also shown is a back wall 14 as a non-continuous element of the scoop 12 that connects the remaining portions of the scoop 12 to the arm 28.

It is thus believed that the operation and construction of the present invention will be apparent from the foregoing description. While the apparatus shown or described has been characterised as being preferred it will be obvious that various changes and modifications may be made therein without departing from the spirit and scope of the invention as defined in the following claims.

What is claimed is:

1. A water conservation apparatus comprising:

a scoop having a screen panel, a bottom panel, a top panel, a back wall, and two side walls, wherein said screen panel, said bottom panel, said top panel and said two side walls form a front end of said scoop for receiving a portion of water from a water spill zone, wherein said screen panel in said scoop front end forms a filter for preventing leaves and debris from entering through said scoop front end, and wherein said bottom panel, said back wall and said two side walls form a cavity for holding said portion of water;

an arm having a bottom end, a top end and a middle portion therebetween, wherein said arm bottom end is fixed to said scoop back wall;

a stand having a top end and a bottom end, wherein said top end of said stant is pivotably connected to said arm middle portion for pivoting said stand at an oblique angle from said arm for supporting said arm to a first position for contacting a support surface with said stand bottom end and for pivoting said stand to a second position substantially parallel to said arm for convenient storage;

a conduit having a first end and second end, wherein said conduit first end is fluidly connected to said cavity for accepting said portion of water;

a pump having an intake and an output, wherein said pump is attached to said scoop top panel and said pump intake is fluidly connected to said conduit second end for supplying a vacuum through said conduit to transfer said portion of water from said holding cavity to said pump; and a hose having an entrance and an exit, wherein said hose entrance is fluidly connected to said pump output for transferring said portion of water from said pump to said hose exit for delivery of said portion of water to a desired location.

2. The water conservation apparatus in accordance with claim 1 further comprising a hand grip attached to said top end of said arm.

3. The water conservation apparatus in accordance with claim 1 further comprising a foot attached to said stand bottom end.

4. The water conservation apparatus in accordance with claim 1, wherein said screen panel is composed of material selected from the group consisting of steel grating, plastic grating or wire mesh.

5. A water conservation apparatus comprising
- a scoop having a bottom, two side walls and a rear wall, wherein the front of said bottom and the front of said two side walls form an entrance for accepting an aliquot of water from a water spill zone, and wherein the back of said bottom, the back of said two sides and said rear wall form a trap for temporarily holding said aliquot of water;
- a conduit having a first end and a second end, wherein said conduit first end is fluidly connected to said trap for drawing off said aliquot of water from said trap into said conduit;
- a pump having an input and an output, wherein said input is fluidly connected to said conduit second end for pumping said aliquot of water through said conduit to said pump;
- wherein said pump is for pumping said aliquot of water from said pump out through said pump output.

6. The water conservation apparatus in accordance with claim 5, wherein said pump is attached to said rear wall of said scoop.

7. The water conservation apparatus in accordance with claim 5, further comprising an arm having a proximate end, a distal end and a middle portion, wherein said proximate end of said arm is attached to said rear wall of said scoop for convenient manipulation and positioning of said water conservation apparatus.

8. The water conservation apparatus in accordance with claim 7 wherein said pump is attached to said middle portion of said arm.

9. The water conservation apparatus in accordance with claim 7 further comprising a handle attached to said distal end of said arm.

10. The water conservation apparatus in accordance with claim 9 wherein said handle is a D-type handle.

11. The water conservation apparatus in accordance with claim 7 further comprising a stand having a first and second end, wherein said first end of said stand is pivotably attached to said middle portion of said arm for pivoting said stand so that said second end of said stand contacts a support surface at an oblique angle to said arm for supporting said arm and for maintaining said water conservation apparatus in a stand alone position, and wherein said first end of said stand is pivotably attached to said middle portion of said arm for pivoting said stand to a second position substantially parallel to said arm for convenient storage of said water conservation apparatus.

12. The water conservation apparatus in accordance to claim 5 wherein said scoop further includes a cover attached to the tops of said side walls.

13. The water conservation apparatus in accordance to claim 12 wherein said pump is attached to the top side of said cover.

14. The water conservation apparatus in accordance to claim 5 wherein said scoop bottom, said scoop two sides and said scoop rear wall are made from a single piece of material and seamlessly connected.

15. The water conservation apparatus in accordance to claim 5 wherein said scoop further comprises a grating attached to the front end of said scoop bottom and the front ends of said two side walls of said scoop, wherein said grating is for filtering out leaves and other debris while allowing said aliquot of water to enter through said entrance of said scoop.

16. The water conservation apparatus in accordance with claim 5 further comprising
- a cover attached to the tops of said side walls of said scoop, wherein said pump is attached to said cover;
- a grating attached to the front end of said scoop bottom and the front ends of said two side walls of said scoop, wherein said grating is for filtering out leaves and other debris while allowing said aliquot of water to enter through said entrance of said scoop into said scoop trap;
- an arm having a proximate end, a distal end and a middle portion, wherein said proximate end of said arm is attached to said rear wall of said scoop for convenient manipulation and position of said water conservation apparatus;
- a handle attached to said distal end of said arm;
- a stand having a first and a second end, wherein said first end of said stand is pivotably attached to said middle portion of said arm for pivoting said stand so that said second end of said stand contacts a support surface at an oblique angle to said arm for supporting said arm and for maintaining said water conservation apparatus in a stand alone position, and wherein said first end of said stand is pivotably attached to said middle portion of said arm for pivoting said stand to a second position substantially parallel to said arm for convenient storage of said water conservation apparatus; and
- a hose having a inlet end and an outlet end, wherein said hose inlet end is fluidly connected to said pump for receiving said aliquot of water from said pump and for transferring said aliquot of water through said hose and out of said hose outlet to a desired location.

17. A water conservation apparatus comprising:
- a scoop having a receiving means, a filter means and a holding means, wherein said receiving means for receiving water from a water spill zone, wherein said filter means for filtering leaves and debris from said received water, and wherein said holding means for holding said received water;
- an arm means attached to said scoop for positioning and for manipulating said scoop;
- a support means pivotally attached to said arm means for contacting a support surface, for supporting said arm means in an upright position, and for conveniently storing said water conservation apparatus by pivoting said support means substantially parallel to said arm means;
- an uptake means fluidly connected to said holding means for uptaking said received water from said holding means;
- a pump means attacted to said scoop means and fluidly connected to said uptake means for pumping said received water from said holding means through said uptake means into said pump means; and
- an output means fluidly connected to said pump means for outputting said received water from said pump means through said output means to a desired location.

* * * * *